Inventor
Francis E. Vanslager

United States Patent Office 3,274,070
Patented Sept. 20, 1966

3,274,070
FUEL ELEMENT WITH IMPROVED PURGE
GAS ARRANGEMENT
Francis E. Vanslager, San Diego, Calif., assignor to General Dynamics Corporation, New York, N.Y., a corporation of Delaware
Filed May 31, 1963, Ser. No. 284,497
8 Claims. (Cl. 176—76)

This invention relates to fuel elements for use in nuclear reactors and more particularly to an improved fuel element for use in a high temperature gas cooled nuclear reactor.

Various types of gas cooled nuclear reactors are well known for the generation of power and for other purposes. Gas cooled nuclear reactors may be operated at conditions in which the reactor core temperature is substantially in excess of 1800° F. At temperatures in excess of 1800° F., a reactor system may be provided which has up to about 40 percent increased thermal efficiency and increased power density. However, at these high operating temperatures thermal stresses occur within individual fuel elements in the reactor core which cause the fuel elements to have a slight tendency to bow toward one another. This slight bowing of the fuel elements toward one another is magnified by the temperature difference generated across the fuel elements due to heat radiation and the inability of the coolant gas to pass between the bowed fuel elements. When two fuel elements bow toward one another it is possible that the maximum safe operating temperature of the fuel elements may be exceeded, causing failure of the fuel element or an unsafe condition within the reactor core.

Fuel elements are generally manufactured by a casting or machining process. Attempts have been made to manufacture fuel elements by an extrusion process, but in general these attempts have been unsuccessful.

It is the principal object of the present invention to provide an improved fuel element for use in gas cooled nuclear reactors. It is another object to provide a fuel element for use in high temperature gas cooled nuclear reactors which has a reduced tendency toward bowing at high operating temperatures. A further object of the invention is to provide a fuel element for use in high temperature gas cooled nuclear reactors which is capable of being formed by an extrusion process. Yet another object is to provide a fuel element for use in a high temperature gas cooled nuclear reactor which is easy to construct and which is economical in operation.

These and other objects of the invention are more particularly set forth in the following detailed description and in the accompanying drawings of which:

Figure 1:
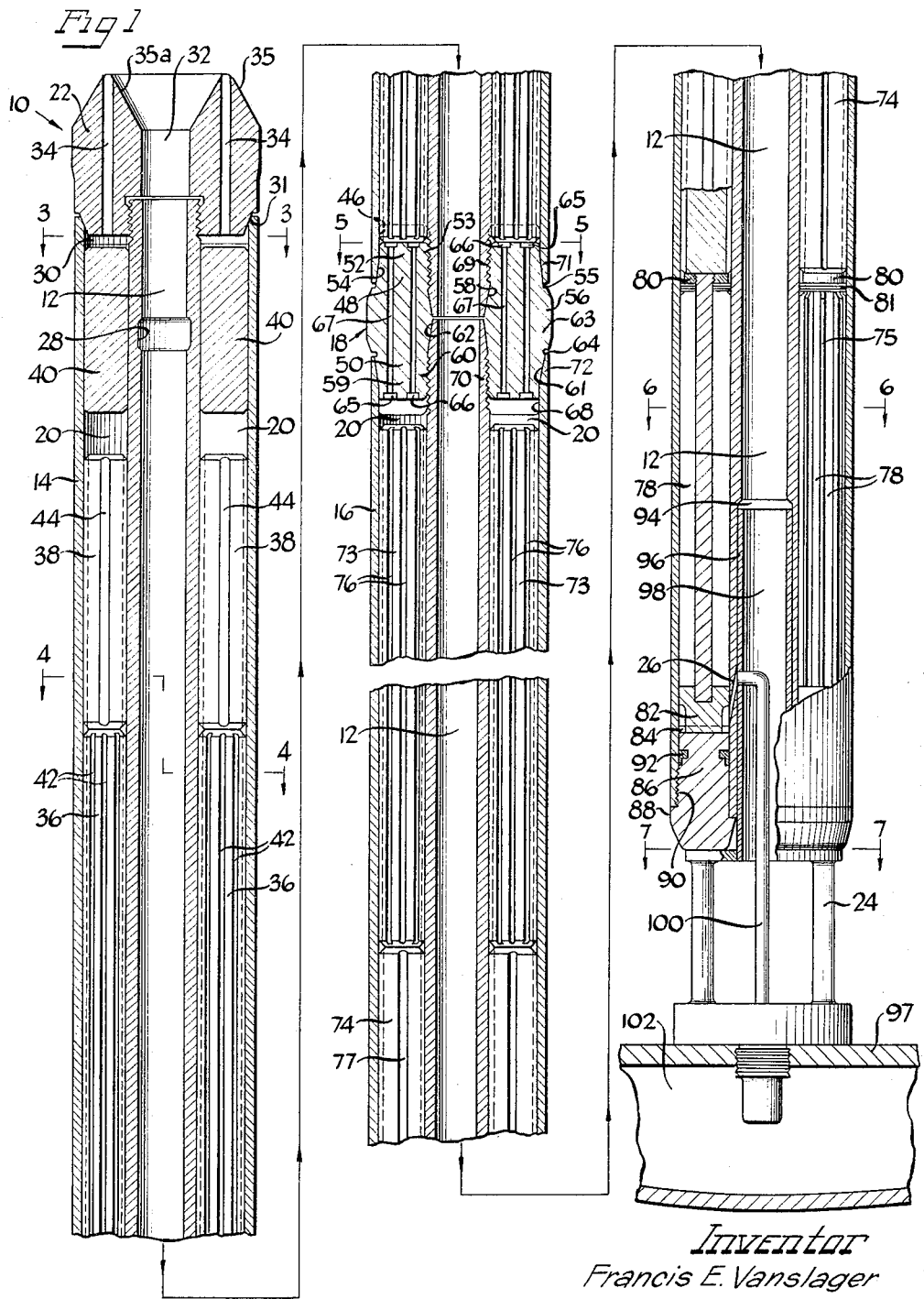
FIGURE 1 is a vertical cross sectional view of a fuel element showing various features of the present invention.

Generally, the fuel element shown in the drawings comprises an elongated impervious fuel element 10 having a bore 12 extending therethrough. The fuel element 10 comprises a plurality of individual fuel element bodies and includes an upper fuel body 14 and a lower fuel element body 16 which are maintained in a suitable coaxial alignment by a connector 18. Each of the fuel bodies 14 and 16 contains a plurality, i.e., at least two, fuel chambers 20 which are adapted to receive a fissionable fuel. The upper fuel body 14 is provided with a gas distributing cap 22 for passing a purge gas into fuel chambers 20. The lower fuel body 16 is adapted to be supported on a conventional standoff 24 and is provided with a passageway 26 through which the purge gas passes out of the fuel chambers.

Referring now to the drawings in detail, there is shown in FIGURE 1 a fuel element 10 constructed in accordance with the present invention. For purposes of explanation, the fuel element is described as it is orientated in a reactor core. Fuel element 10 includes an elongated, generally cylindrical impervious upper fuel body 14 and a lower elongated, generally cylindrical impervious fuel body 16, each of which are formed having central bore extending therethrough. Fuel bodies 14 and 16 may be constructed from any suitable moderating material which can withstand the operating conditions in a reactor core and which is impervious to a coolant gas, e.g., helium, and to fission products formed during operation of the nuclear reactor. One such material is graphite having a helium porosity of less than $10^{-2}$ cm.$^2$ per second.

The graphite fuel bodies 14 and 16 may be fabricated by any suitable process, such as casting and/or machining. However, the symmetrical shape of the preferred embodiment shown in the drawings lends itself to an extrusion operation.

The provision of the bore 12 in the fuel element 10 is of particular importance. As more fully described hereinafter, the bore 12 allows coolant gas to pass through the interior of the fuel element as well as along the exterior of the fuel element. The fuel element is cooled both interiorly and exteriorly, resulting in an increased transfer of heat from the fuel element to the coolant gas. The increased transfer of heat causes an increase in the power density of a nuclear reactor employing such fuel elements, which results in a saving in space requirements for the reactor.

Figure 2:
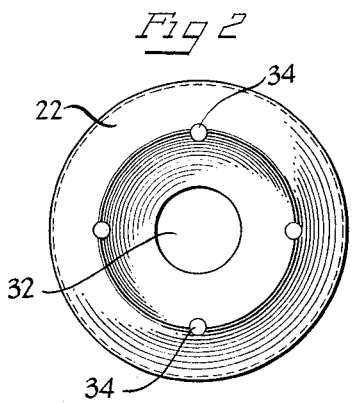
FIGURE 2 is a plan view of the fuel element of FIGURE 1.
Figure 3:
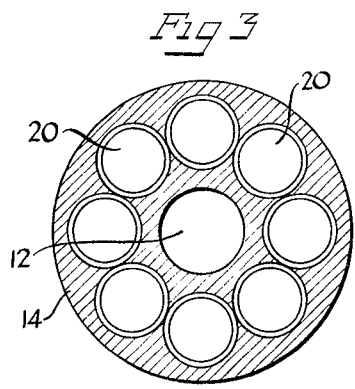
FIGURE 3 is a sectional view taken along line 3—3 of FIGURE 1.

A plurality of spaced apart generally cylindrical, longitudinally extending fuel chambers 20 are provided in the wall of fuel bodies 14 and 16. As can be seen from FIGURE 3, fuel chambers 20 in fuel body 14 are symmetrically arranged within the wall of fuel body 14, the centers thereof being located in a concentric circle. The fuel chambers in fuel body 16 are arranged in an identical manner to that shown in FIGURE 3. Alternately, the fuel chamber 20 may be in the form of an annular chamber between two separate graphite cylindrical tubes. However, due to the differential thermal expansion that occurs when the ends of two independent graphite cylinders are sealed, it is preferred that the fuel chamber is formed as separate, spaced apart chambers substantially as shown. The bore 12 of the fuel body 14 is formed with a recess 28 therein so that the fuel element can be handled within the reactor core by an appropriate conventional grappling mechanism. The upper end portion of fuel body 14 is provided, as by suitable machining techniques, with a recess 30. A gas distributing cap 22 is adapted to fit into recess 30 and is attached to fuel body 14 by suitable means, i.e., threads. The gas distributing cap 22 is formed having a beveled surface 31 on the lower portion thereof which cooperates with a corresponding beveled surface on recess 30 to provide a frictional seal between cap 22 and recess 30. The gas cap 22 has a central bore 32 extending therethrough which, when cap 22 is connected to body 14, cooperates with bore 12 in body 14. As seen in FIGURE 2, the wall of gas cap 22 contains a plurality of passageways 34 therethrough which communicate with recess 30 and fuel chambers 20 in fuel body 14. The gas cap 22 is preferably provided with beveled surfaces 35 and 35a for aerodynamics purposes. A portion of the coolant gas, e.g., helium, in the form of a purge gas stream passes through bore 34 of cap 22 into recess 30, through a porous plug 40 and downwardly into the fuel chambers 20 within fuel body 14. Gas cap 22 may be constructed from any suitable material which can withstand the operating temperatuures within the reactor, e.g., graphite, and may be manufactured by any suitable process.

Figure 4:
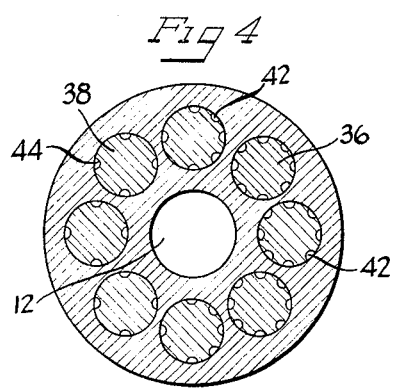
FIGURE 4 is a sectional view taken along line 4—4 of FIGURE 1.

Each of the fuel chambers 20 within fuel body 14 is adapted to receive a fissionable fuel 36, a reflector 38 and a filter 40 arranged one above the other within the chamber 20. The fissionable fuel 36 is disposed in the lowermost portion of fuel chambers 20 in fuel body 14. Any form of fissionable fuel may be employed within the fuel element 10. It has been found that a desirable fuel is a fuel compact which comprises a mixture of uranium dicarbide and thorium dicarbide dispersed in a graphite matrix. It has been found that this type of fuel resists the migration of fission products from the fuel which is desirable when an unclad fuel element is to be fabricated. Other fuels which may be employed include fuel compacts of uranium dioxide, thorium dioxide, thorium dicarbide, discrete carbon coated particles of uranium dicarbide and thorium dicarbide, etc., or any other form of fissionable material. When a fuel compact is employed, as shown in FIGURES 1 and 4, the compact preferably is formed having a number of grooves 42 in the surface thereof in order to enhance the flow of helium purge gas through the fuel chambers and along the surface of the fuel compacts.

A reflector 38 is disposed in fuel chambers 20 directly above fuel compact 36 and rests upon the upper surface of fuel compact 36. The reflector 38 may be formed from any suitable moderator or reflector material such as graphite, beryllium oxide, etc. The reflector 38 is also preferably formed having grooves 44, similar to grooves 42 in fuel compact 36, to aid the flow of purge gas through the chambers 20. A porous filter 40, e.g., porous graphite, is disposed in fuel chambers 20 above reflector 38 to prevent the introduction of extraneous impure materials into fuel chamber 20 which may cause poisoning of the fuel or otherwise reduce the efficiency of the reactor.

The lower end wall of fuel body 14 is provided, as by suitable machining techniques, with a recess 46. As seen in FIGURE 1, the fuel compacts 36, arranged in the lowermost portion of fuel chamber 20 in fuel body 14, extend into recess 46 and rest upon the upper surface of a connector 18 which connects the upper fuel body 14 and the lower fuel body 16 and retains the fuel bodies in coaxial alignment.

Figure 5:
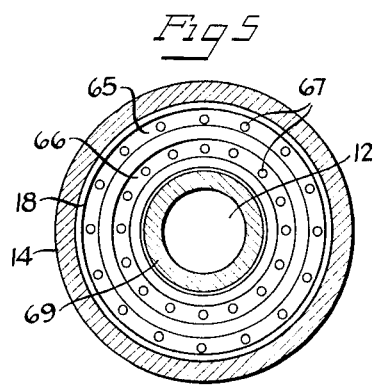
FIGURE 5 is a sectional view taken along line 5—5 of FIGURE 1.

More specifically, connector 18, as shown in FIGURES 1 and 5, has an annular shape and comprises generally symmetrical upper and lower portions 48 and 50. The upper port 48 has an uppermost terminal portion 52 of reduced thickness. The inner surface 53 of terminal portion 52 is suitably threaded for engagement with a correspondingly threaded surface in recess 46. The outer surface of terminal portion 52 has a beveled portion 54 which terminates in a shoulder 55 of a protruding midportion 56, which extends beyond the outer surface of the fuel element when in an assembled relation and forms a spacing ring to maintain the fuel element in proper alignment within the reactor core. A beveled surface 58 is formed on the inner wall of upper portion 48 below the threaded surface 53.

Lower portion 50 of connector 18 is formed with surfaces corresponding to the above described upper portion 48. In this connection, lower portion 50 has a terminal portion 59, the inner surface of which has a threaded surface 60 and a beveled surface 62. Lower portion 50 also has an outer beveled surface 61 which terminates in a shoulder 64 of a protruding mid-portion 63.

As can best be seen in FIGURE 5, the end surfaces of terminal portions 52 and 59 of connector 18 are provided with two concentric grooves 65 and 66. A plurality of spaced apart passageways 67 through connector 18 are arranged in grooves 65 and 66 for the passage of purge gas, e.g., helium, from fuel chambers 20 in fuel body 14 into fuel chambers 20 in fuel body 16.

The recess 46 in the lower end wall of fuel body 14 receives the terminal portion 52 of connector 18. The upper end wall of fuel body 16 is provided with a similar recess 68 which receives terminal portion 59 of connector 18. The inner walls 69 and 70 of recesses 46 and 68 are suitably threaded adjacent the bottom of the respective recesess 46 and 68 to engage the threaded surfaces 53 and 60 of connector 18. The terminal portions of walls 69 and 70 are beveled so as to frictionally engage beveled surfaces 58 and 62 of connector 18. As seen in FIGURE 1, outer walls 71 and 72 of recesses 46 and 68 are of lesser height than inner walls 69 and 70, and terminate adjacent shoulders 55 and 64 of connector 18 when assembled. The terminal portions of walls 71 and 72 are beveled so as to frictionally engage surfaces 54 and 61 of connector 18.

It can be seen that connector 18 acts to coaxially align fuel bodies 14 and 16 in a manner which allows for the flow of coolant gas upwardly through the bore 12 of fuel element 10 and the flow of purge gas downwardly through the fuel chambers 20 of fuel body 14, through passageways 67 in connector 18 into the fuel chambers 20 in fuel body 16. The connector provides for a threaded connection at one surface of engagement and a frictional connection at another surface of engagement. The use of a single threaded connection, in combination with a frictional connection, as opposed to two threaded connections, allows for a larger tolerance between the mating pieces and allows the use of extruded graphite body pieces which do not require extensive machining after extrusion.

The fuel chambers 20 in lower fuel body 16 are adapted to receive a fissionable fuel compact 73, a reflector 74 and a fission products trapping reagent 75 disposed one below another in chambers 20. The fuel compact 73 is advantageously constructed in the same manner as the aforementioned fuel compact 36 and may be formed from the same fissionable materials. The fuel compact 73 also desirably has a number of grooves 76 in the outer surface thereof to aid in the flow of purge gas downwardly through fuel chamber 20. In a similar manner, reflector 74 is identical to reflector 38 and contains a number of grooves 77 in the surface thereof for the passage of purge gas through fuel chamber 20.

Figure 6:
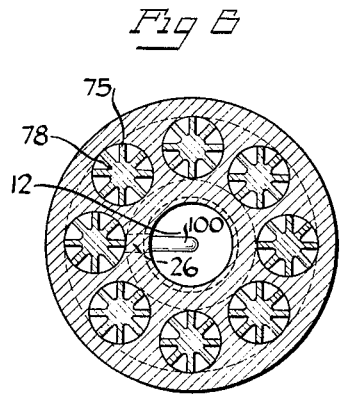
FIGURE 6 is a sectional view taken along line 6—6 of FIGURE 1.
Figure 7:
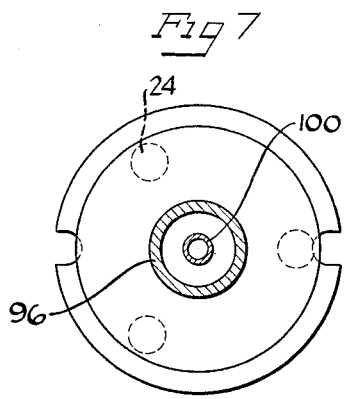
FIGURE 7 is a sectional view taken along line 7—7 of FIGURE 1.

A fission products trapping reagent 75 is disposed in the lowermost portion of fuel chambers 20 in fuel body 16. The trapping reagent 75 is employed to remove condensible fission products having a relatively short half life from the purge gas which has passed over the fuel compacts 36 and 73. The fission products trapping reagent may be constructed from any suitable material, such as silver coated charcoal. The reagent 75 is preferably arranged in the form of an elongated compact and as shown in FIGURE 6, and contains a number of grooves 78 in the surface thereof for the passage of purge gas through chamber 20.

A trap nut is threadably connected to the upper end of trapping reagent compact 75. The trap nut 80 supports reflector 74 and retains a graphite cloth filter 81 in place atop trapping reagent compact 75. The graphite cloth filter 81 prevents the accidental flow of particles of trapping reagent or condensed fission products upwardly into contact with the fuel compact 73. The trapping reagent compact 75 is supported on a trapping reagent filter 82 which is disposed in the lowermost portion of fuel chamber 20 in fuel body 16. The trapping reagent filter 82 may be formed from porous graphite or another suitable material which prevents the flow of fission products trapping reagent out of chamber 20. The lower end wall of fuel body 16 is, as by suitable machining techniques, provided with a recess 84 which is adapted to receive an end portion 86 of an annular bottom cap 88, which may be constructed of any suitable material such as graphite. Outer wall 90 of recess 84 is suitably threaded and engages a correspondingly threaded surface on end portion 86 to retain the bottom cap 88 in place. End portion 86 carried a seal 92, e.g., a silicon braze, to seal the bottom of fuel chambers 20 against leakage of the purge gas. The trapping filter 82 is supported on the upper surface of bottom cap 88.

The lower portion of bore 12 of fuel body 16 is enlarged, as by suitable machining techniques, to form a counterbore 94 which is adapted to receive a cylindrical plug 96 of a standoff 24 for mounting on a grid plate 97 of a reactor core (not shown). Plug 96 has a bore 98 extending therethrough which cooperates with bore 12.

A suitable pipe 100 is disposed within bore 98 and extends through the wall of plug 96 to communicate with passageway 26 in the wall of fuel body 16 to allow passage of the purge gas from the fuel chambers 20 through passageways 26 and pipe 100 into a lower header 102 below grid plate 97.

The purge gas is removed from header 102 by suitable pumps, not shown. The pumps maintain the pressure in the fuel chambers 20 at a lower pressure than the pressure of the coolant gas surrounding the fuel element 10 in bore 12. This pressure differential causes a portion of the coolant gas to be drawn into the fuel chambers 20 through the passageways 34 in gas cap 22.

In operation, a number of fuel elements 10 are mounted on standoffs 24 on a grid plate 97 within a reactor in a conventional manner. Spacing rings formed by the enlarged portions 56 and 63 of connector 18 maintain the fuel elements in correct alignment. A portion of a suitable coolant gas, e.g., helium, is caused to pass upwardly through the bore 12 of the fuel element, through bore 32 of gas cap 22 and out of the fuel element. Another portion of the coolant gas flows around the outside of the fuel element. A reduced pressure in the chambers 20, caused by the withdrawal of purge gas through header 102, causes a portion of the coolant gas to be drawn through passageways 34 in gas cap 22 into fuel chambers 20 in fuel body 14 in the form of a purge gas stream. The purge gas which enters fuel chambers 20 passes downwardly through the porous graphite filter 40 and along the surface of reflector 38 and fuel compact 36. As the purge gas passes along the surface of fuel compact 36 it sweeps away fission products produced in fuel compact 36 during operation of the reactor. The purge gas then passes through passageways 67 in connector 18 and passes over the surface of fuel compact 73 where further fission products are picked up and swept out of contact with the fissionable fuel. The purge gas then passes across the surface of reflector 74 and through the porous graphite cloth 81 into contact with the fission products trapping reagent. 75. The fission products trapping reagent removes the condensible fission products from the purge gas. The purge gas passes through the porous graphite filter 82 into passageway 26 and into pipe 100 from which it passes into a lower header 102 and is withdrawn from the reactor by suitable pumps.

In this manner, the fission products are removed from the fissionable fuel, the condensible fission products are removed by a fission products trapping reagent and the remaining fission products may be transported to an external trap.

The activity in the primary coolant system can be controlled by any suitable external trap. It has been found that it is not necessary to remove all of the fission products from the primary coolant that are not removed by the trapping reagent. A safe operating level can be achieved by bypassing only a portion of the primary coolant through the external trap.

In one embodiment, fuel elements for use in a high temperature, gas cooled 500 megawatt nuclear reactor may be constructed from two extruded fuel body sections 4.6 inches in diameter. The upper fuel body section is 9 feet 6 inches in length and the lower fuel body section is 10 feet 2 inches in length. The fuel bodies are provided with a central bore having a diameter of 1.25 inches and 8 spaced apart fuel chamber in the wall thereof, each of which has a diameter of 1 inch. The upper and lower fuel bodies are joined together by an annular connector of the type described of approximately 4 inches in length. Fissionable fuel compacts are disposed in the fuel chambers of the upper and lower fuel bodies over a length of 16½ feet. An upper graphite reflector 6¾ inches in length and a lower graphite reflector 1 foot in length are disposed in the fuel chambers above and below the fuel compacts. A porous graphite filters 3 inches in length is disposed in the fuel chambers about the upper reflector and a silver coated charcoal trapping reagent compact having a length of 10¾ inches is disposed in the lowermost portion of the fuel chambers in the lower fuel body. Each of the fuel compacts, reflectors and trapping reagent compacts are provided with suitable grooves to allow for the passage of helium purge gas through the fuel chambers. The overall length of the fuel element, including an upper gas distributing cap and a standoff, is 20 feet.

It can be seen that an improved fuel element has been provided which may be formed by suitable extrusion techniques. The fuel element is easily extruded since the fuel chambers are spaced apart in the wall of the annual element. Further, a fuel element has been described which is capable of being formed from separate fuel body sections which are connected together to form a fuel element. The fuel element described in capable of operation at temperatures in excess of 1800° F. for extended periods of time and has increased resistance to bowing at high temperatures.

It is apparent that, although a particular construction has been described and shown in the drawings in order to present a clear understanding of the invention, the invention is capable of being utilized with alternative structures and it is not intended that the invenion be limited solely to the structure that is shown in the drawings and which has been paricularly described.

Various of the features of the invention are set forth in the following claims.

What is claimed is:

1. A fuel element for use in a nuclear reactor comprising, a plurality of body pieces each of which includes a bore extending longitudinally therethrough and a plurality of fuel chambers in the walls thereof, fissionable fuel disposed in said fuel chambers, means retaining said body pieces in coaxial alignment with one another, said means having a bore therethrough allowing communication between said bores in said body pieces, said means having a passageway therethrough communicating between said chambers in said body pieces, interengaging means on said retaining means and on said body pieces preventing longitudinal movement of said body pieces relative to said retaining means, means for passing a coolant gas through said bores of said body pieces, and means for passing a coolant gas into said chamber of one of said body pieces, whereby said coolant gas will flow into said chamber of one of said body pieces and through said retaining means into said chamber of another of said body pieces.

2. A fuel element for use in a nuclear reactor comprising, a plurality of body pieces, each of said body pieces including a bore extending longitudinally therethrough and a plurality of fuel chambers in the wall thereof, fissionable material disposed in said fuel chambers, means retaining said body pieces in coaxial alignment with one another, said means having a bore therethrough allowing communication between said bores in said body pieces and a passageway extending therethrough communicating between said chambers in said body pieces, interengaging means on said retaining means and on said body pieces preventing longitudinal movement of said body pieces relative to said retaining means, said interengaging means including beveled surfaces on said retaining means engaging said body pieces, means for passing a coolant gas through said bores of said body pieces, and means for passing a coolant gas into said chamber of one of said body pieces, whereby said coolant gas will pass into said chamber of one of said body pieces and through said retaining means into said chamber of another of said body pieces.

3. A fuel element for use in a nuclear reactor comprising, a plurality of body pieces, each of said body pieces including a bore extending longitudinally therethrough and a plurality of fuel chambers in the wall thereof, a fissionable material disposed in said fuel chambers, means for retaining said body pieces in coaxial alignment with one another, said means having a bore therethrough allowing communication between said bores of said body pieces, said means including an enlarged central portion intermediate its ends, said means having beveled surfaces thereon engaging correspondingly beveled surfaces on each of said body pieces, said means having a passageway in the wall thereof communicating between said chambers in said body pieces, interengaging means on said retaining means and on said body pieces preventing longitudinal movement of said body pieces relative to said retaining means, means for passing a coolant gas through said bores of said body pieces, and means for passing a coolant gas into said chamber of one of said body pieces, whereby said coolant gas will pass into said chamber of one of said body pieces and through said retaining means into said chamber of another of said body pieces.

4. A fuel element for use in a gas-cooled nuclear reactor, which fuel element comprises first and second elongated body pieces, each of said body pieces having a bore extending therethrough, said first body piece having at least one fuel chamber therein, said second body piece having at least one chamber therein, fissionable material disposed in said fuel chamber, a connector retaining said elongated body pieces in coaxial alignment with each other, said connector having a central portion, opposed terminal portions and a beveled surface intermediate said central portion and each of said terminal portions, said connector also having a bore extending therethrough that connects said bores in said body pieces in fluid communication, each of said body pieces having a recess in the end thereof adjacent said connector which recess receives said terminal portions of said connector, each of said recesses having a beveled wall portion frictionally engaging one of said beveled surfaces on said connector, said connector also having a passageway extending therethrough which joins said chambers of said body pieces in gas-tight fluid communication, interengaging means formed on said connector and on said recess-defining walls which prevent longitudinal movement of either of said body pieces relative to said connector, and means for establishing a purge flow of gas into said fuel chamber, through said connector, and into said chamber of said second body piece, whereby fission products can be purged from said fuel chamber without leakage into the reactor coolant stream at the connector-body piece joints.

5. A fuel element for use in a gas-cooled nuclear reactor, which fuel element comprises a plurality of body pieces, each of said pieces having a bore extending longitudinally therethrough and also having at least one fuel chamber therein, fissionable material disposed in said fuel chambers, a connector retaining said body pieces in coaxial alignment with each other, said connector having a central portion, opposed annular terminal portions and a beveled surface intermediate said central portion and each of said terminal portions, said connector also having a bore extending therethrough that connects said bores in said body pieces in fluid communication, said connector also having a threaded portion intermediate said central portion and each of the ends thereof, each of said body pieces having walls which define an annular recess in the end thereof adjacent said connector which recess receives one of said terminal portions of said connector, one of said recess-defining walls of each body piece including a beveled wall portion which frictionally engages one of said beveled surfaces on said connector, one of said recess-defining walls of each body piece being formed with threads that mate with said threads on said connector and prevent longitudinal movement of said body pieces relative to said connector, said connector also having a passageway extending therethrough which joins said fuel chambers of said body pieces in gas-tight fluid communication, said bores of said body pieces being adapted for passage of a coolant stream of gas therethrough, and means for establishing a purge flow of gas into said fuel chamber of one of said body pieces and out of said fuel chamber of said connected body piece whereby said purge gas will pass through said connector without leaking into the coolant stream.

6. A fuel element for use in a gas-cooled nuclear reactor comprising first and second elongated body pieces each of which includes a bore extending longitudinally therethrough and a plurality of spaced longitudinally extending fuel chambers, said chambers extending to adjacent end walls of said body pieces, fissionable material disposed in said fuel chambers, a connector retaining said body pieces in coaxial alignment, said connector having a bore therethrough which joins said bores in said body pieces in fluid communication, said connector also having passageways therethrough joining said fuel chambers in said body pieces in fluid communication, said connector having a central portion and opposed terminal portions of reduced thickness relative to said central portion, said connector having inner and outer beveled surfaces intermediate said central portion and said terminal portions, each of said body pieces having walls which define an annular recess in the end thereof adjacent said connector which recess respectively receives one of said terminal portions of said connector, said bore of said connector having internal threads which mate with external threads on said recess-defining walls and prevent longitudinal movement of said body pieces relative to said connector, said recess-defining walls including beveled wall portions which engage said beveled surfaces on said connector when said mating threads are interengaged, said bores of said body pieces being adapted for passage of a coolant stream therethrough, said first body piece having entrance means so gas may enter into said fuel chambers therein, and means for withdrawing gas from said fuel chambers of said second body piece whereby a purge flow of gas can be established through said fuel chambers of said first body piece, through said connector, and through said fuel chambers of said second body pieces without leakage of the purge flow into the coolant stream at said connector.

7. A connector for joining two elongated body pieces in coaxial alignment as a part of a fuel element, at least one of which body pieces contains a fuel chamber wherein fissionable fuel is disposed, and which body pieces also have recesses which terminate in beveled wall portions and which have one threaded wall, which connector comprises a generally cylindrical member having terminal portions at each end which are adapted to respectively engage an end of each of the elongated body pieces and thereby maintain the two body pieces coaxially aligned, threads on said terminal portions for mating with the threads on the recess-defining walls to prevent any longitudinal movement of the body pieces relative to said member, and beveled surfaces on said terminal portions so located to be adapted to frictionally engage the beveled wall portions of the recess-defining walls and create a gas-tight seal therebetween when said mating threads are interengaged, said member having a passageway extending therethrough for connecting the fuel chamber in gas-tight fluid communication with a chamber in the other body piece whereby a purge flow of gas can be established through the fuel chamber and through said member without leaking at said connector.

8. A connector for joining two elongated body pieces in coaxial alignment as a part of a fuel element, which body pieces each contain a longitudinally extending bore and a fuel chamber wherein fissionable fuel is disposed, and each of which body pieces also has an annular recess which has one threaded wall and another wall that terminates in a beveled wall portion, which connector comprises a generally annular-shaped member having annular terminal portions at each end which are adapted to respectively engage an end of each of the elongated body pieces and thereby maintain the two body pieces coaxially aligned, threads on said terminal portions for mating with the threads on the recess-defining walls to prevent any longitudinal movement of the body pieces relative to said member, and beveled surfaces on said terminal portions adapted to frictionally engage the beveled wall portions of the recess-defining walls and create a gas-tight seal therebetween, said member having a bore therethrough for connecting the bores of the body pieces to each other and also having a passageway extending therethrough for connecting the fuel chambers in gas-tight fluid communication whereby a purge flow of gas can be established between the fuel chambers, through said member, without leaking at said connector.

References Cited by the Examiner

UNITED STATES PATENTS

| 1,521,482 | 12/1924 | Steele | 285—133 |
| 1,981,863 | 11/1934 | Harris | 285—133 |
| 2,956,000 | 10/1960 | Kendall et al. | 176—83 |
| 2,985,575 | 5/1961 | Dennis et al. | 176—43 |
| 2,988,495 | 6/1961 | Battle | 176—73 |
| 3,033,773 | 5/1962 | Schluderberg et al. | 176—43 |
| 3,105,030 | 9/1963 | McGeary et al. | 176—73 |

FOREIGN PATENTS 571,126  3/1959  Belgium.

L. DEWAYNE RUTLEDGE, *Primary Examiner.*

R. L. GRUDZIECKI, *Assistant Examiner.*

REUBEN EPSTEIN, CARL D. QUARFORTH,
*Examiners.*